(12) United States Patent
Day et al.

(10) Patent No.: US 11,605,069 B2
(45) Date of Patent: Mar. 14, 2023

(54) METHOD AND SYSTEM FOR ASSISTING TRANSACTIONS

(71) Applicant: Coinbase, Inc., San Francisco, CA (US)

(72) Inventors: Kevin Day, San Francisco, CA (US); Robert Green, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 633 days.

(21) Appl. No.: 16/585,494

(22) Filed: Sep. 27, 2019

(65) Prior Publication Data

US 2020/0104835 A1   Apr. 2, 2020

Related U.S. Application Data

(60) Provisional application No. 62/737,801, filed on Sep. 27, 2018.

(51) Int. Cl.
| | |
|---|---|
| *G06Q 20/36* | (2012.01) |
| *G06F 16/23* | (2019.01) |
| *G06Q 30/02* | (2012.01) |
| *G06Q 20/38* | (2012.01) |
| *G06Q 20/22* | (2012.01) |
| *G06Q 30/0201* | (2023.01) |

(52) U.S. Cl.
CPC ..... *G06Q 20/3676* (2013.01); *G06F 16/2365* (2019.01); *G06F 16/2379* (2019.01); *G06Q 20/29* (2013.01); *G06Q 20/3674* (2013.01); *G06Q 20/389* (2013.01); *G06Q 20/3829* (2013.01); *G06Q 30/0201* (2013.01); *G06Q 30/0206* (2013.01); *G06Q 2220/00* (2013.01)

(58) Field of Classification Search
None
See application file for complete search history.

(56) References Cited

U.S. PATENT DOCUMENTS

| 11,188,918 B1* | 11/2021 | Kurani | G06Q 20/405 |
|---|---|---|---|
| 2005/0187856 A1* | 8/2005 | Rabenold | G06Q 40/04 |
| | | | 705/37 |
| 2015/0035643 A1 | 2/2015 | Kursun | |
| 2016/0350749 A1* | 12/2016 | Wilkins | G06Q 40/12 |
| 2019/0087793 A1* | 3/2019 | Dickerson | H04L 9/3247 |
| 2019/0227740 A1* | 7/2019 | Song | G06F 3/0679 |
| 2019/0295049 A1* | 9/2019 | Karame | G06Q 20/0658 |
| 2020/0074416 A1* | 3/2020 | Mathew | G06Q 20/24 |

OTHER PUBLICATIONS

"A First look at Paradex, An ERC20 relay launching mid-November", https://medium.com/paradex/paradex-first-look-e11260232354, Oct. 17, 2017, 3 pages.

(Continued)

*Primary Examiner* — Neha Patel
*Assistant Examiner* — Nicholas K Phan
(74) *Attorney, Agent, or Firm* — Perkins Coie LLP

(57) ABSTRACT

A method for assisting transactions preferably includes a relayer wherein the relayer maintains an orderbook, and wherein the relayer is specified as the taker on all orders in the orderbook. The method incorporates matching buy and sell orders into a single, atomized batch order, price adjusting for spread, and passing the gain from the spread to the second order in the orderbook.

20 Claims, 11 Drawing Sheets

(56) References Cited

OTHER PUBLICATIONS

"GitHub—ParadexRelayer/Consumer-API-docs: Documentation for Paradex.io public API", https://kovan-api.paradex.io/consumer, retreived Jul. 17, 2018.

"Introducing DDEX.io", https://medium.com/ddex/introducing-ddex-io-eb1d1c0d93, 4 pages, retrieved Aug. 6, 2019.

"Introducing Paradex—Paradex—Medium", https://medium.com/paradex/introducing-paradex-86f72d0f66db, 2 pages, retrieved Jul. 17, 2018.

"What is DDEX.io? How does it work?—Quora", https://www.quora.com/What-is-DDEX-io-How-does-it-work, 7 pages, retrieved Aug. 6, 2019.

Chen, Richard, "A Comparison of Decentralized Exchange Designs", The Control, https://thecontrol.co/a-comparison-of-decentralized-exchange-designs-1deef249f56a, Apr. 18, 2018, 9 pages.

Warren, Will, et al., "0x: An open protocol for decentralized exchange on the Ethereum blockchain", Feb. 21, 2017, 16 pages.

\* cited by examiner

METHOD AND SYSTEM FOR ASSISTING TRANSACTIONS

CROSS-REFERENCE TO RELATED APPLICATIONS

This application claims the benefit of U.S. Provisional Application No. 62/737,801, filed 27 Sep. 2018, which is incorporated in its entirety by this reference.

TECHNICAL FIELD

This invention relates generally to the cryptocurrency field, and more specifically to a new and useful transaction matching system and method in the cryptocurrency field.

BACKGROUND

In decentralized currency systems, cryptocurrency value is transferred on the blockchain network by sending transactions. Transactions are verified by miners, who are paid a fee to perform the verification (miner's fee, transaction fee). Verified transactions are logged in a decentralized ledger, the blockchain. These transactions are time-delayed between the moment a blockchain transaction is broadcast to the network and the moment that same transaction is mined into a block. During the intervening period, transactions sit in a "mempool", or pending transaction pool, waiting to be mined. The blockchain transactions are asynchronous as well as transparent to outside observers via public nodes. The time delay and transparent nature are such that when a transaction is submitted to the transaction pool, miners can choose to include it.

In the current state of decentralized exchanges, the miners can be "bribed" with additional miner's fees in exchange for including a transaction in the block. In this scenario, transactions that will influence the market price of a blockchain-based asset are intercepted from the mempool by one or more outside observers, and those observers then step in front of those transactions to gain a price advantage at the expense of others.

When one transaction offers a higher miner's fee than other transactions, rational miners prioritize that transaction. On decentralized exchanges, a transaction is broadcast by a party to miners to see if they are interested in filling the order. Traders can inject their transaction with a slightly higher—even one billionth of a penny higher, for example—"gas price", or unit used to measure how much a trader is willing to pay, and miners will bump them to the front of the queue. This is often termed "front running", and is considered both common and undesirable within decentralized exchanges. One reason this is considered undesirable is that in exchanges, the parties expect transactions to be ordered in a certain way, called "price-time priority". In price-time priority, orders are prioritized for execution first according to their price, and orders of the same price are then ranked depending on when they were entered. With frontrunning on decentralized exchanges, however, since anyone can broadcast an order to a relayer, the transactions are ordered according to who's willing to pay the most, and it's a race to see who gets to that highest amount first. This breaks the expected order of exchanges, and allows for transactions to be gamed at the expense of others.

One potential solution for front-running is to implement a transaction matching model in which for every transaction, the decentralized exchange acts as the "taker", injecting maker orders into a smart contract for settlement, rather than the miner acting as the taker. However, this introduces an additional problem within the maker-taker model of decentralized exchange, concerning price spreads. Because everyone trades through the exchange as the taker, if there's any discrepancy in the price due to spread, then the exchange collects the arbitrage, or gain between the two orders. This is undesirable, because exchanges typically don't function this way. The taker can sign an order for greater than the best price available in the orderbook. When the taker does this, they are supposed to be refunded the difference. If the exchange takes the difference instead, then that's not desirable for miners within the exchange.

Thus, there is a need in the cryptocurrency field to create a new and useful transaction matching system and method to prevent front running while allowing for price adjustment based on spread. The source of the problem, as discovered by the inventors, is a lack of price adjustment to satisfactorily handle spread within cryptocurrency exchanges. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
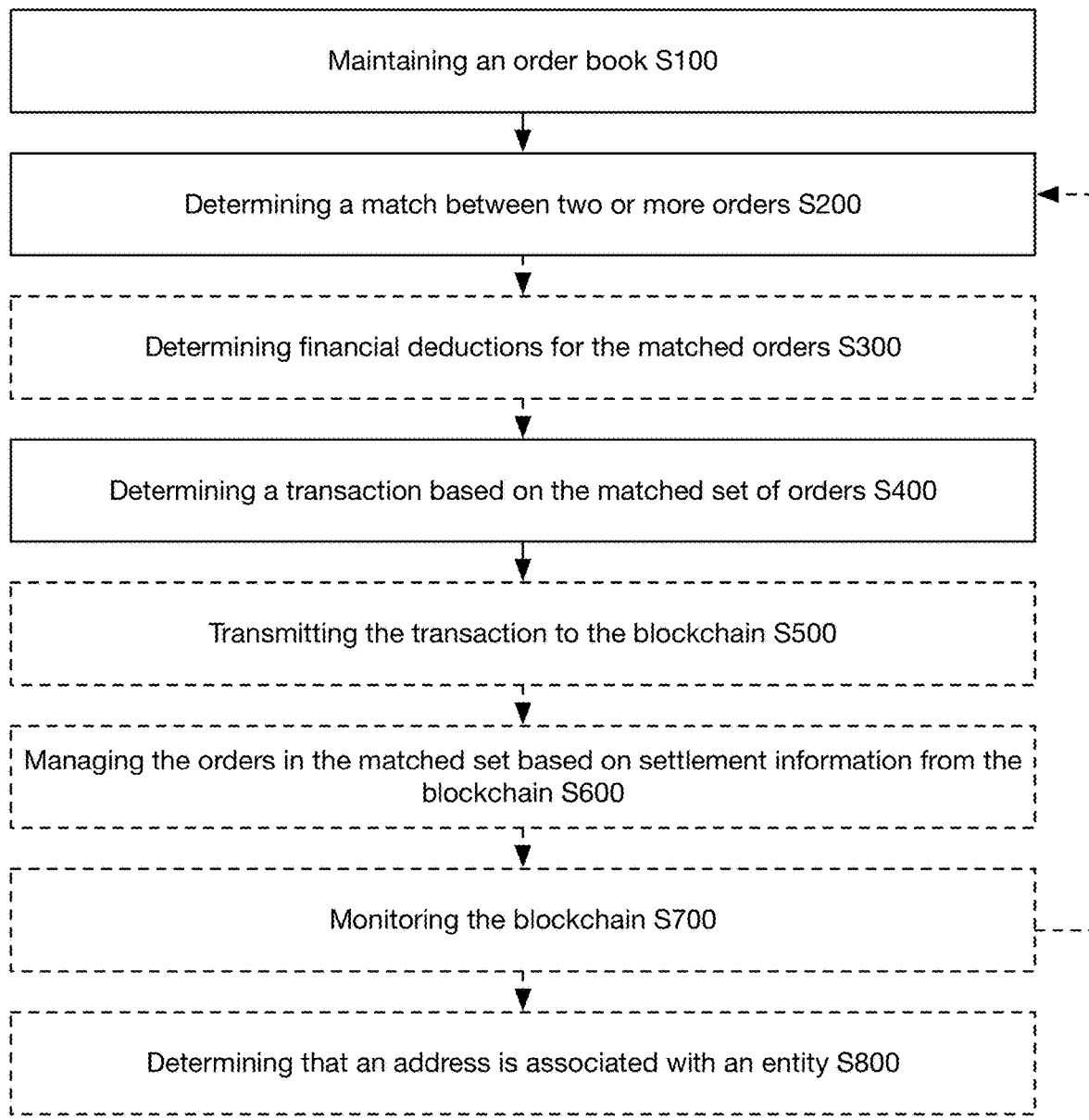
FIG. 1 is a schematic representation of the method.
Figure 11:
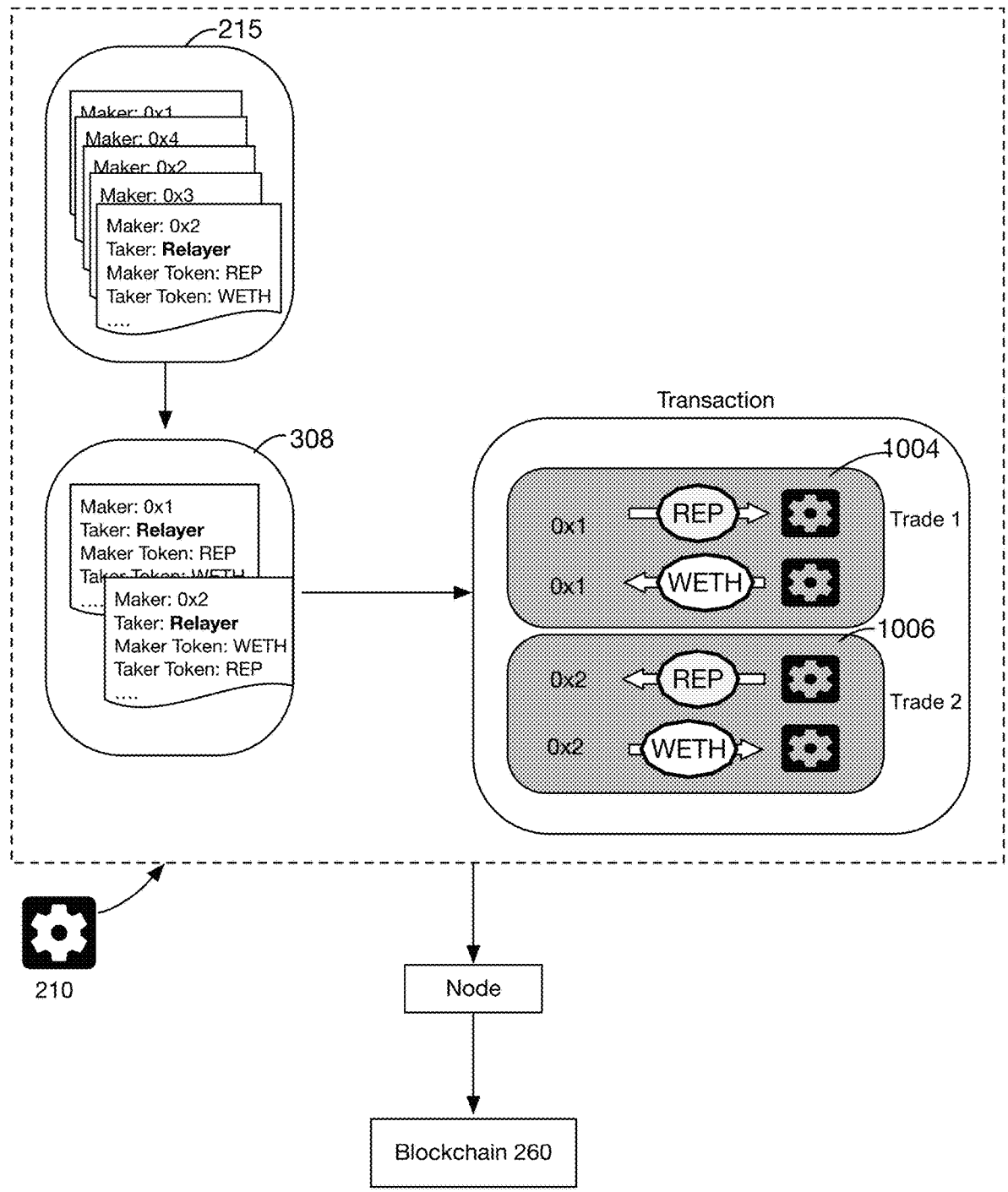
FIG. 11 depicts a variant of the method.

A shown in FIG. 1, the method for assisting transactions includes: maintaining an orderbook S100; determining a match between two or more orders S200; determining a transaction based on the matched set of orders S400; transmitting the transaction to the blockchain S500; and managing the orders in the matched set based on settlement information from the blockchain S600. The method can additionally or alternatively include determining financial deductions for the matched orders S300; monitoring the blockchain S700; and determining that an address is associated with an entity S800. The method functions to match orders to form a transaction, and optionally to settle the transaction on the blockchain. An example of the method is shown in FIG. 11.

Figure 2:
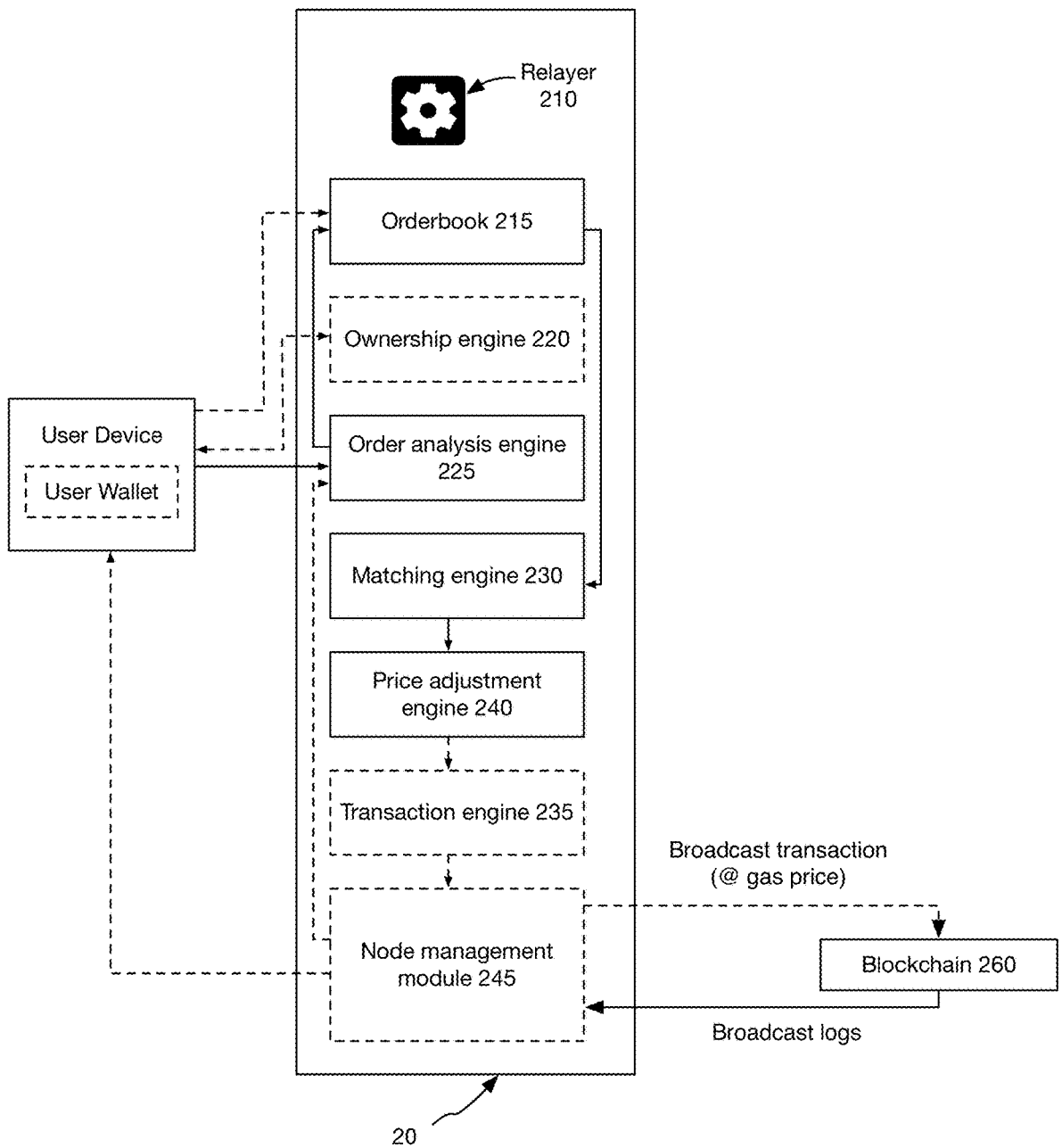
FIG. 2 is a schematic representation of a system variant.

As shown in FIG. 2, the system 20 preferably includes a relayer 210 that interfaces with a blockchain 260. The relayer preferably includes: an orderbook 215, an order analysis engine 225, a matching engine 230, a transaction engine 235, a price adjustment engine 240, and a node management module 245. The system additionally or alternatively includes an ownership engine 220 and/or any other suitable element.

The method is preferably performed using the system 20, however, the method can additionally or alternatively be performed using any other suitable system.

2. Benefits.

This method can confer several benefits over conventional transaction methods in cryptocurrency exchanges.

First, in cryptocurrency exchanges with conventional transaction methods, the problem of "front running" arises, wherein traders can inject their transaction with a slightly higher—even one billionth of a penny higher, for example— price, or "gas price", a unit used to measure how much a trader is willing to pay. In return, miners will move that transaction to the front of their queue, as miners are incentivized and can be expected to select transactions that are more profitable and provide more return for them. This breaks the price-time priority expectation of traders within exchanges. This problem is particularly pervasive in distributed cryptocurrency exchanges, where the blockchain miners determine which trades are settled first.

This method provides the benefit of eliminating the problem of front running by matching the traders' orders and submitting the trades to the blockchain on the traders' behalf, thereby enforcing a desired trading order. In particular, the method reduces the problem by matching two orders in an exchange with each other, and requiring both orders to stipulate that the relayer is the "taker" and both order parties (e.g. buyer and seller) are "makers". With this switched role of the parties, the buyer always buys from the relayer, and the seller always sells to the relayer. The relayer, as taker, has its own wallet interfacing with both the buyer and the seller. The relayer matches orders based on price-time priority, and if a party attempts to front run by designating itself as the taker and injecting a transaction with a higher gas price, the transaction will fail because that party is not authorized to be the taker, only the relayer is authorized to be the taker. In variants, this can be enforced by the relayer itself (e.g., by rejecting orders with non-relayer addresses as the recipient), by the smart contracts associated the relayer. and/or otherwise enforced.

Second, since the relayer is the taker, the relayer determines the gas price at which to broadcast the transaction.

Third, in order to ensure that a transaction is not killed due to insufficient funds, the relayer only matches orders that are determined to be funded based on listening to logs, associated with the orders' maker address, that are broadcasted by the blockchain. In variants, the method can mark orders associated with addresses (e.g., public addresses) that have confirmed sale assets above the order amount (and/or unfilled orders associated with the addresses that collectively add up to less than the address' confirmed sale assets) as "funded," wherein the method only matches funded orders. However, order fundedness can be otherwise determined and/or enforced.

Fourth, within many decentralized cryptocurrency exchanges, including those built on the ox protocol, for example, gains from price spreads are designed to accrue to the exchange itself. A price spread is the difference or delta between the price at which someone is willing to buy and the price at which someone is willing to sell. For example, if Alice is willing to buy 5 ZRX at 0.0011 ETH, and Sue is willing to sell 5 ZRX at 0.001 ETH, then there's a price spread of +0.0001 ETH. In variants of this method, there is adjustment of the price spread such that it is conferred to a selected entity (spread receiver). The spread receiver can be the relayer, the address associated with the second order on the books (e.g., by the order's time of receipt by the relayer), the address associated with the first order on the books, or any other suitable entity. For example, the selected entity can be the second order on the books, thus ensuring the second party to the transaction gets the extra profit (and/or ensuring that the transaction is settled at the price that the first party set). The price spread can be accounted for in the atomic transaction sent by the relayer to the blockchain (e.g., wherein the trade from the relayer to the selected entity includes the spread), in a separate transaction after the atomic transaction is verified or confirmed, or otherwise sent to the selected entity.

Fifth, traditional cryptocurrency exchanges are "custodial" in nature, meaning the exchange is in possession of users' cryptocurrency and/or acts as the custodian of users' private keys. This leads to a lack of transparency within an exchange, and requires that users trust the exchange with sensitive information (e.g., the user's private key). In variants, the matching model, trade execution, and price adjustment of this method are "non-custodial" in nature, meaning users retain complete control of their funds, and those funds stay in the user's possession (e.g., associated with the user's address; within their cryptocurrency wallet; etc.) until a trade takes place.

Sixth, many cryptocurrency exchanges, including decentralized exchanges, include exchange fees that the exchange takes out of transactions. However, they do not calculate exchange fees taken out of the profit from the price spread first before passing any price spread on to the second order party. Some embodiments of this method factor in exchange fees that can be taken from the price spread before passing it on to a user of the exchange.

3. System.

As shown in FIG. 2, the system 20 preferably includes a relayer 210 that interfaces with a blockchain 260. The system functions to perform all or portions of the method, but can perform any other suitable function.

The system preferably interacts with a set of tokens. The token is preferably a cryptocurrency asset, but can additionally or alternatively be an index (e.g., representative of a bundle of cryptocurrency assets), and/or be any other suitable digital asset. More preferably, the system interacts with the cryptocurrency blockchain(s) that support each token, but can otherwise interact with the tokens. The token is preferably compliant with the same standard and/or tradable on the same blockchain, but can additionally or alternatively be compliant with different standards and/or be tradable on different blockchains (e.g., wherein multiple transactions are generated and sent to different blockchains for each matched set of orders). For example, the token can be ERC-20-compatible token (e.g., REP, WETH, ZRX, etc.).

The system 20 preferably includes a distributed backend (e.g., processing on a plurality of servers), but can additionally or alternatively include a unitary backend. The system 20 is preferably off-chain (e.g., not on the blockchain; interface with the blockchain), but can alternatively be on-chain. In variants, the method is performed off-chain, wherein the transactions output by the method are verified and settled by the blockchain (e.g., on-chain).

The system 20 preferably includes a relayer 210. The relayer preferably functions to receive orders from users, wherein the users are associated with respective addresses and assist in trades between users. The relayer preferably includes: an orderbook 215, an order analysis engine 225, a matching engine 230, a transaction engine 235, a node management module 240, but can additionally or alternatively include an ownership engine 220 or any other suitable module.

The relayer is preferably associated with one or more public addresses. The public address is preferably an on-chain recipient of tokens. The relayer can have different public addresses for different tokens and/or assets, but can additionally or alternatively have the same public address for all tokens, or any other suitable public address. The relayer's public address is preferably compliant with the same protocol(s) as the maker addresses (e.g., from the orders), but can be otherwise configured. For example, the relayer can have the same Ethereum address for all tokens.

The relayer preferably includes an orderbook 215. The orderbook preferably functions to store orders used by a subset of the system components. The orderbook is preferably a database stored in persistent memory, but can additionally or alternatively be store in any other suitable memory.

The orderbook preferably includes a set of all orders (e.g., persistent, unsettled), but can include only unsettled orders (e.g., unmatched orders, unfunded orders, orders that have not been confirmed by the blockchain), settled orders (e.g., settled by the blockchain), and/or any other suitable set of orders. The set of all orders are preferably organized by priority according to orderbook priority rules, but the orders can additionally or alternatively have no priority (e.g., be a pool of orders) or otherwise organized. The orders of the set of all orders can be associated with different addresses, the same addresses, or any other suitable addresses.

Each order is preferably associated with a public address, wherein the public address is associated with an entity or user (e.g., seeking to sell a maker token and seeking to buy a taker token; holding a private key or seed associated with the public address; etc.) and one or more user devices and/or wallets. The order is preferably generated by the user (e.g., by the wallet, by the user device), but can additionally or alternatively be generated by the relayer. The order is preferably signed by the user (e.g., with the private key corresponding to the address; by the user device, by the wallet, etc.), but can additionally or alternatively be unsigned. The order is preferably signed by the user before the order is received by the orderbook, but can additionally or alternatively be signed after a match is determined by the matching engine, or signed at any other suitable time. The signed order is preferably valid (e.g., confirmable or verifiable by the blockchain, wherein blockchain confirmation of only the order would transfer funds to the "taker" or relayer), but can alternatively be invalid (e.g., not confirmable or verifiable by the blockchain).

Each order preferably includes a set of order parameters. The order parameters can include: a maker public address (sender public address), a maker token (cryptocurrency asset to be sold), a maker token amount (amount of cryptocurrency asset to be sold), taker public address (recipient public address), a taker token (cryptocurrency asset to be purchased), a taker token amount (amount of cryptocurrency asset to be sold), an expiration time (e.g., for the order to expire), fees, and/or any other suitable parameter. The order parameters can be set by the relayer API, protocol, or interface; the user, be predetermined, or otherwise set.

The order parameters preferably include a maker public address. The maker public address is preferably associated with an entity (e.g., the user seeking to sell the maker token).

The order parameters preferably include a taker (e.g., recipient), which indicates the recipient of the sold maker token. The taker is preferably a public address, but can additionally or alternatively be any other suitable endpoint.

In one variant, for orders received from the user, the taker is preferably the public address associated with the relayer (e.g., exchange address).

In a second variant, for signed orders generated by the relayer, the taker is preferably the user seeking to buy the token.

In a third variant, for orders that are filled by the users (e.g., wherein the relayer matches, but do not fill, the orders), the taker is preferably the matched recipient.

The public addresses (e.g., maker public address, taker public address) are preferably compliant with a base cryptocurrency's protocol (e.g., ERC20) wherein the traded assets (e.g., maker token, taker token) are also compliant with the base cryptocurrency's protocol. However, the public address can be compliant with a specific cryptocurrency's protocol (e.g., wherein a second address, compliant with the taker token's protocol, can be provided along with the entity's order), be generated by the relayer (e.g., and sent to the entity or user device), and/or be otherwise configured or provided.

The public address(es) can additionally or alternatively be associated with a wallet balance (e.g., determined based on the history of transactions stored on the blockchain that are associated with the public address, such as transactions to/from the public address, etc.), but can additionally or alternatively be a proxy address (e.g., associated with a second entity that is authorized to sign on behalf of the entity or the public address' owner), and/or be any other suitable address associated with any other suitable entity.

The order parameters preferably include a maker token, which can be an identifier for the asset that the user is seeking to sell or trade away, and can include a taker token (e.g., identifier for the asset that the user is seeking to buy or obtain). The tokens can be selected from a predetermined set of assets, be any suitable asset compliant with a predetermined set of rules (e.g., compliant with a protocol, ERC-20 compatible, etc.), and/or be any other suitable asset.

The order parameters can additionally or alternatively include: a timestamp (e.g. when the order is received, when the order is marked as funded after being marked as unfunded, or otherwise determined), an expiration duration (and/or expiration timestamp), the number of maker tokens, the number of taker tokens, an order type, order conditions, and/or any other suitable parameter.

For example, an order type can be a limit order (e.g., order to buy at or above a specific price, order to buy at or above a specific taker token amount, etc.); a market order (e.g., order to buy or sell taker token or maker token, respectively, immediately); a stop order (stop-loss order) such as an order to buy a taker token or sell a maker token once the corresponding maker token amount or taker token amount, respectively, reaches a stop amount (e.g., above or below a market price); and/or any other suitable order type. The platform can: selectively change the state of orders based on the order type (e.g., mark the order as open when the market satisfies the order type's conditions; mark the order as unknown or unfunded when the market does not satisfy the order type's conditions); order orders within the orderbook according to the order type; match orders according to the order type; and/or otherwise use the order type.

The order is preferably associated with a state such as unknown, open/funded, closed, or unfunded. The order state is preferably determined by the order analysis engine, but can be otherwise determined. The unknown state is preferably the default state. An order can be associated with the unknown state when an order is received from a user, when the address associated with the order is not associated with a wallet balance, in response to receipt of a cancellation or hold request from the user (e.g., the address associated with the order), and/or upon satisfaction of any other suitable set of conditions. The order can be associated with an open state when: an order is funded, an order has not expired, upon verification of the user (e.g., upon valid challenge signature confirmation), and/or upon satisfaction of any other suitable set of conditions.

The order can additionally or alternatively associated with a funded or an unfunded state (e.g., order fundedness). Determining the order fundedness and only matching funded orders can function to minimize the number of rejected or killed transactions (e.g., due to lack of funds). The fundedness of an order is preferably determined after the address is associated with a wallet balance, but can be determined at any other suitable time. The order is preferably associated with the funded state when the wallet balance is above a predetermined fund threshold, such as: the number of maker tokens in the order (e.g., the number of tokens the user is seeking to trade away); the number of maker tokens and an estimated gas fee; and/or any other suitable threshold. The newly-funded order can optionally be associated with a new timestamp (e.g., time of funding), which can function to reset the order timestamp for matching (e.g., price-time priority matching). The order is preferably associated with the unfunded state when the wallet balance is below the predetermined fund threshold. When the address is associated with multiple unfilled orders that collectively sum to more than the wallet's maker token balance, the method can select a subset of orders to mark as funded, up to the wallet's maker token balance.

The method can select the orders to mark as funded: by proximity to market (e.g., wherein the maker token-to-taker token ratio within the order is closest to another funded order's corresponding maker token-to-taker token ratio; wherein the order's pricing is closest to the market ratio, as determined from an external market database; etc.), by increasing or decreasing age, by decreasing or increasing amount, and/or otherwise selected. In one example, the method includes: determining a market price (e.g., from the orderbook, from a third party source), prioritizing orders associated with a public address (and, optionally, maker token) based on proximity to market, and marking orders, in order of decreasing proximity, that collectively sum to less than the wallet balance, as funded. In a specific example, if a user is associated with a public address that is the maker on three orders, wherein the first order is selling 5 maker tokens, the second order is selling 6 maker tokens, and the third order is selling 4 maker tokens, and wherein the wallet balance associated with the public address is 13, then the first order would be funded. The second order would be compared to the wallet balance after funding the first order (e.g., 8), so the second order is also funded. However, the wallet balance after funding the second order (e.g., 2) is below the threshold determined by the third order (e.g., 4), so the third order is unfunded. In a second example, the first order can sell 5 ZRX for 6 VIDT and a second order can sell 5 ZRX for 10 VIDT; when the respective wallet balance includes 6 ZRX and the market price is 1 ZRX:1 VIDT, the method can mark the first order as funded (e.g., closest to market) and mark the second order as unfunded. The second order can be marked as funded if: the wallet funds increase (e.g., to 10 ZRX or more), the market rate changes to 1 ZRX:1.5 VIDT (e.g., wherein the first order can be market unfunded), or upon satisfaction of any other suitable set of conditions. However, the orders can be otherwise marked as funded and/or unfunded.

The order is preferably associated with a closed state (filled state) when the order is settled on the blockchain and the transaction is filled (e.g., as determined from a log emitted by the blockchain node connected to the system, etc.).

In a first variation, when a transaction is settled on the blockchain (e.g., filled), the relayer can mark the orders associated with the transaction (e.g., within the transaction) as filled. In a second variation, when a transaction is killed, the relayer can rebroadcast the same transaction (e.g., with the same orders) with a different gas price (e.g., higher gas price). In a third variation, when a transaction is settled on the blockchain and the transaction is killed, the relayer can determine the one or more orders that caused the transaction to fail, and can associate those orders with an unfunded, unknown, and/or unfilled state. In this variation, the one or more orders that did not fail the transaction are preferably associated with the funded state, rematched and rebroadcast in a different transaction, or otherwise managed. This variation can optionally be performed upon determination that a killed or failed transaction was due to an order within the transaction being unfunded (e.g., wherein the method can determine the fundedness of each order upon receipt of a failed or killed transaction notification from the blockchain). However, the order can be associated with any other suitable state in any other suitable manner.

The relayer preferably includes an order analysis engine 225. The order analysis engine preferably functions to process received orders and maintain the orderbook (e.g., receive orders from users, determine order state, determine order priority, etc.). The relayer can include one or more orderbooks. In the latter variant, different orderbooks can be maintained for: different token pairs, different geographic regions (e.g., determined based on the IP address that the order is received from, determined from an order field, etc.), or for any other suitable differentiating parameter. The order analysis engine can additionally or alternatively verify user ownership of a public address. The order analysis engine can include or be connected to: the node management module (e.g., to transfer the order information to the blockchain; to receive blockchain logs for state determination), the matching engine (e.g., to provide order information for matching), a user interface (e.g., a relayer API, etc. to receive orders and/or receive cancellations from the user). The order analysis engine can include: a set of rules, a set of heuristics, a neural network, and/or any other suitable analysis module.

The relayer preferably includes a matching engine 230. The matching engine preferably functions to determine an order match. The matching engine can be connected to (and/or include) the order analysis engine, a node, and/or any other suitable component. The matching engine preferably includes a set of rules, but can additionally or alternatively include a set of heuristics, be a neural network (e.g., trained on the "best match"), be an optimizer (e.g., optimizing the selected order pairs for: transaction fill probability, market optimization, etc.), and/or The matching engine is preferably a concurrent matching engine (e.g., multi-threaded matching engine; engine that matches multiple orders in parallel), but can alternatively be a non-concurrent matching engine (e.g., sequential matching engine; single threaded matching engine; engine that matches multiple orders sequentially; etc.), any other suitable matching engine. The matching engine can be: generic to all crypto pairs, specific to each crypto pair, or otherwise structured. The matching engine can match or otherwise process orders associated with a single entity sequentially, concurrently, and/or in any other suitable order. The order matching and/or processing order can be determined by the matching engine, by the order analysis engine, or otherwise determined.

The relayer preferably includes a price adjustment engine 240. The price adjustment engine preferably functions to determine deductions from an order, more preferably from the taker token amount returned to the user (e.g., order's public address), but alternatively or additionally from the maker token amount traded away by the user (e.g., by the order's public address). In variants, the price adjustment engine can determine, allocate, and/or extract: relayer fees (e.g., set amount; variable amounts based on order fulfillment difficulty, order amount, current or future order volume, etc.), gas fees, and/or any other suitable set of fees. The price adjustment engine can optionally estimate gas fees for the to-be-broadcast transactions. The price adjustment engine can optionally determine the spread (e.g., gap between a bid and ask price of a token within the matched order pair), and can optionally allocate the spread to a user. The price adjustment engine can include or be connected to: the node management module (e.g., to determine the current gas rates), a gas estimator (e.g., to retrieve a gas estimate for the to-be-broadcast transaction), a token price index, the matching engine, a user interface (e.g., a relayer API, etc.), and/or any other suitable component. The price adjustment engine can include an equation, a set of rules, a set of heuristics, a neural network, and/or any other suitable analysis module.

The relayer can additionally or alternatively include a node management module 245. The node management module can function to broadcast the transaction to the blockchain (e.g., at a gas price). The node management module can additionally or alternatively monitor the blockchain, receive blockchain logs (e.g., logs of the transaction, logs for external transactions associated with public addresses of unfilled orders, etc.).

The node management module is preferably connected to the blockchain. The node management module preferably interfaces with other system components. The node management module can operate continuously; periodically; upon occurrence of a predetermined event (e.g., after determining an order match, after receiving a log associated with a broadcasted transaction, etc.). The node management module can operate after the transaction is signed by the relayer, but can additionally or alternatively operate after the transaction is signed by any other suitable entity.

In one variant, the node management module can determine if the transaction is settled (e.g., filled, killed, etc.), based on receipt of an event, associated with the transaction, from the blockchain.

In a second variant, the node management module can determine a wallet balance for a public address. In this variant, the node management module can: monitor the blockchain for transactions (e.g., both those broadcast by the relayer and those broadcast by others) that are associated with the public address, wherein the relayer can maintain an (off-chain) ledger for the public address' balance for a given token (e.g., maker token in an order submitted in association with the public address) based on the validated transactions. The node management module (and/or other relayer component) can optionally wait a predetermined number of blockchain blocks (e.g., 1 block, 10 blocks, etc.) before confirming the public address' token balance and modifying the 1 public address' ledger based on the validated transaction.

However, the relayer can additionally or alternatively include any other suitable component.

The system 20 preferably interfaces with a blockchain 260. The blockchain is preferably a peer-to-peer network of nodes, executing a common cryptographic currency protocol. The protocol preferably facilitates token exchange on the blockchain. For example the protocol can facilitate ERC-20 token exchange, but can facilitate exchange of any set of tokens that share the protocol. However, the blockchain can additionally or alternatively include any other suitable component.

As shown in FIG. 2, one or more nodes of the blockchain preferably mine transactions at a gas price wherein the gas price is broadcasted with the transaction. When a transaction is settled, the nodes preferably broadcast a log. The nodes can be queried for information (e.g., info about a public address, etc.).

The system preferably maintains one or more nodes of the blockchain. The system node is preferably software executing on a processing system, or be otherwise configured. The system node can be a full node (e.g., with the full blockchain downloaded and available); a partial node or light node that retrieves relevant portions of the blockchain from a trusted source and/or maintains a copy of a portion of the blockchain; a mining node (e.g., that verify blocks broadcast into the network); or be any other suitable blockchain node.

However, the system can additionally or alternatively include any other suitable component.

4. Method.

The method preferably functions to facilitate token (asset) trades without custodying the tokens on behalf of the trading parties (e.g. without holding the trading parties' funds or private keys). In variants, the method functions to match pre-signed orders to form a transaction, and transmit the transaction to the blockchain to be settled. The method is preferably performed by the relayer, wherein the relayer interacts with the blockchain; however, the method can be otherwise performed.

In one variation of the method, the relayer receives a first signed order that is associated with a maker public address (first order's public address), signed by the order maker's private key), and specifies the relayer's public (cryptocurrency) address as the order taker (order recipient). The first signed order can include an identifier for a first token (token to be traded away), a first amount for the first token, an identifier for a second token (token to be obtained), and a second amount for the second token. Upon receipt of the first order, the relayer marks the first order as unknown, and optionally determines the wallet balance associated with the maker public address by querying the blockchain for transactions (historic and/or current transactions) associated with the maker public address and, optionally, the maker token from the first order. When the relayer determines that the wallet balance for the maker token is higher than the order balance for the maker token, the relayer marks the order as funded and/or open. The first order (e.g., open or funded orders, all orders, all unfulfilled orders, etc.) can optionally be placed on the orderbook in a priority queue based on orderbook priority rules and entity priority rules. The aforementioned process can be repeated for a second order, wherein the second order can be: signed by a second private key different from the first private key, be associated with a second public address different from the first public address, include the relayer's public address as the taker address, include the second token as the maker token (token to be traded away), include a third amount for the second token, include the first token as the taker token (token to be obtained), and include a fourth amount for the first token. The first order is matched with a second funded order, based on one or more matching methods (and/or based on the order priority within the orderbook). Fees (e.g., relayer fees, gas fees) can be determined for the matched pair after the match has been made, wherein the fees can be for the pair, for each order within the matched pair, or otherwise determined. The spread between the first and second orders can optionally also be determined after the match has been made.

After the match has been made, a third order, returning a fifth amount of the second token to the first public address, and a fourth order, returning a sixth amount of the first token to the second public address, can be generated. The third and fourth orders can be unsigned or signed by the relayer, and can specify the relayer's public address as the maker address. The fifth and sixth amounts are preferably the second amount and fourth amounts, adjusted based on the fees (and/or spread) allocated to the first and second public addresses, respectively. The first, second, third, and fourth orders are bundled into a transaction (e.g., an atomic transaction), wherein the transaction is signed by the relayer (e.g., using the relayer's public key) and broadcast to the blockchain (e.g., via a node maintained by the relayer). The relayer determines that the transaction is settled and filled (e.g., wherein filling the transaction transfers the fees to the relayer). The relayer can optionally determine a spread receiver, and generate a transaction to send the spread to the spread receiver.

In a second variation of the method, the relayer receives a set of orders (e.g., unsigned orders) from a set of users (e.g., a set of public addresses), the relayer determines whether the associated public addresses are funded, marks unfilled orders from funded addresses as "open," and marks unfilled orders from unfunded addresses as "unfunded." The relayer then matches open orders and transmits a notification to the respective users with the matched order information (e.g., the other party's public address, the traded tokens, the traded token amount(s), etc.), wherein the respective users independently generate signed orders according to the matched order information, wherein the signed orders are transmitted to the blockchain (e.g., by the users, by the relayer) for fulfillment, Maintaining the orderbook S100 functions to determine an order state of one or more orders on the orderbook and/or determine a matching priority for unmatched orders (e.g., all or a subset of orders on the orderbook). S100 is preferably performed by the order analysis engine, but can be otherwise performed. All and/or portions of S100 can be determined: after a predetermined period (e.g., a parameter set by the relayer, 5 min, 10 min); after determining a wallet balance associated with a public address, wherein the public address is associated with one or more orders on the orderbook; when a new order is received; periodically; upon receipt of a blockchain log; but can additionally or alternatively be at any other suitable time.

S100 can include receiving orders. Receiving orders preferably functions to receive and process orders to populate the orderbook. Orders can be received from one or more public addresses, each associated with different entities or users. Each order can be received through an API, at or through a smart contract, or otherwise received. The orders are preferably signed by the entity (e.g., with the respective private key), but can additionally or alternatively be unsigned. The public key, used to generate the public address, and the private key are preferably part of an asymmetric key pair; however, any other suitable cryptographic architecture can be used.

In one variation, the order analysis engine can determine if an order, received by the relayer, specifies the taker as the public address associated with the relayer. When the order specifies the taker as the public address associated with the relayer, the order analysis engine can add the order to the orderbook.

S100 can optionally include determining a state for an order. Determining a state for an order can function to determine whether the order is available for trading (e.g., not expired, not already filled, etc.), determine whether the order's public address has sufficient funds for trading (e.g., to preclude sending a transaction that will not be filled). Example order states include: unknown, open, funded, matched, closed/filled, unfunded, expired, and/or any other suitable state. Order states can be determined for: new orders, unfilled orders, all orders, or any suitable set of orders. The order state can be determined based on: order age, public address fundedness, the order type, blockchain state (e.g., whether the order has been filled), and/or otherwise determined.

In one variation, upon receipt of a new order, the new order's state is set to unknown. Upon determination that the order is valid (e.g., funded, confirmed by the user, order type conditions are satisfied, etc.), the new order can be marked as open. Upon determination that the order is invalid (e.g., not funded, not confirmed by the user, order type conditions not satisfied, cancelled, etc,), the order can be marked as unfunded, closed, cancelled, be deleted, or be otherwise managed. The order state can be marked as matched upon match determination; marked as closed or filled upon transaction filling or validation (e.g., in response to receipt of a blockchain event indicating transaction validation; in response to confirmation of transaction verification, such as validation of a predetermined number of blocks after transaction verification); and marked as open (or reevaluated for validity) upon transaction failure. The order state can be marked as expired, closed, or be deleted from the orderbook upon order expiration (e.g., after a predetermined time period, after the expiration time specified by the order, etc.). However, the order states can be otherwise determined.

Determining the order state can include determining the current market price for a token pair (e.g., the token pair of the order). The current market price can be: determined based on unfilled orders within the orderbook; determined based on orders received within a predetermined time duration; retrieved from an external source (e.g., an index), or otherwise determined.

Figure 4:
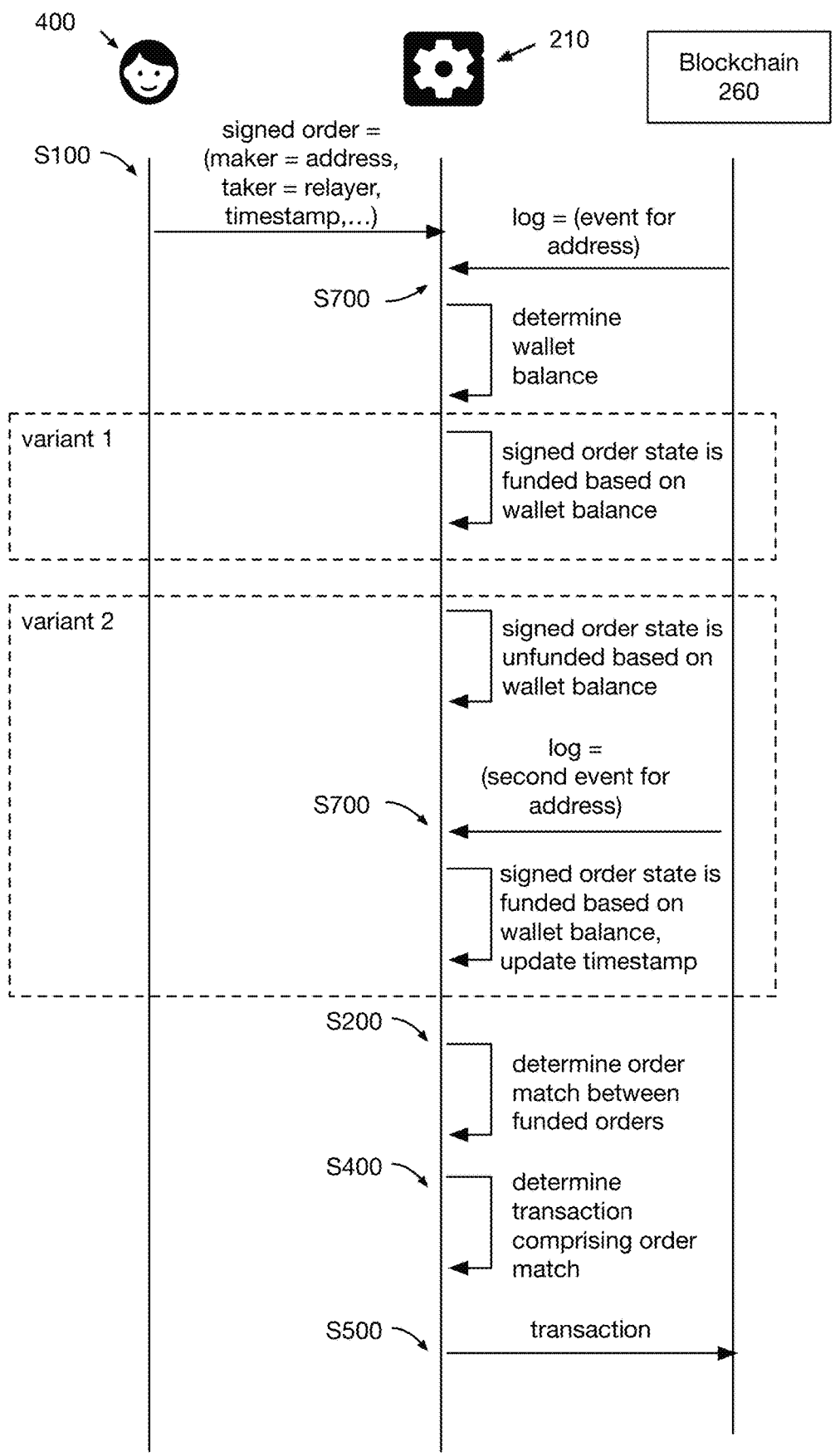
FIG. 4 depicts variants of information shared between a user associated with an address and components of the system.

Determining a state for an order can include determining fundedness, which functions to determine whether the order is funded, and/or whether the public address associated with the order has sufficient funds to cover the order (example shown in FIG. 4). Fundedness can be determined for: all unfilled orders, all unknown orders, all filled orders, all unfilled orders, and/or orders associated with any other suitable state. Order fundedness for one or more orders can be determined: in response to receipt of a new order for the public address; in response to an increase in the wallet balance; in response to a decrease in the wallet balance (e.g., not due to fulfillment of a relayer-submitted order, as determined based on the log or event identifier or hash); and/or at any other suitable time.

Determining order fundedness can include: monitoring the blockchain for transactions associated with the order's public address (e.g., by monitoring events emitted by the blockchain node and associated with the public address); determining a wallet balance for the maker tokens (from the public address' orders) associated with the public address, based on the transactions associated with the order's public address (e.g., by maintaining an offchain ledger for each public address, each public address-maker token combination, etc.); and selecting the public address' orders (in the orderbook) that satisfy a set of selection conditions as funded; marking the selected orders as open or funded; and marking the remaining (unfilled) orders from the public address as unfunded. The selected orders associated with the public address can be limited to: open orders only, unfilled orders only, unexpired and open orders only, all orders, and/or any other suitable set of orders associated with the public address.

Figure 9:
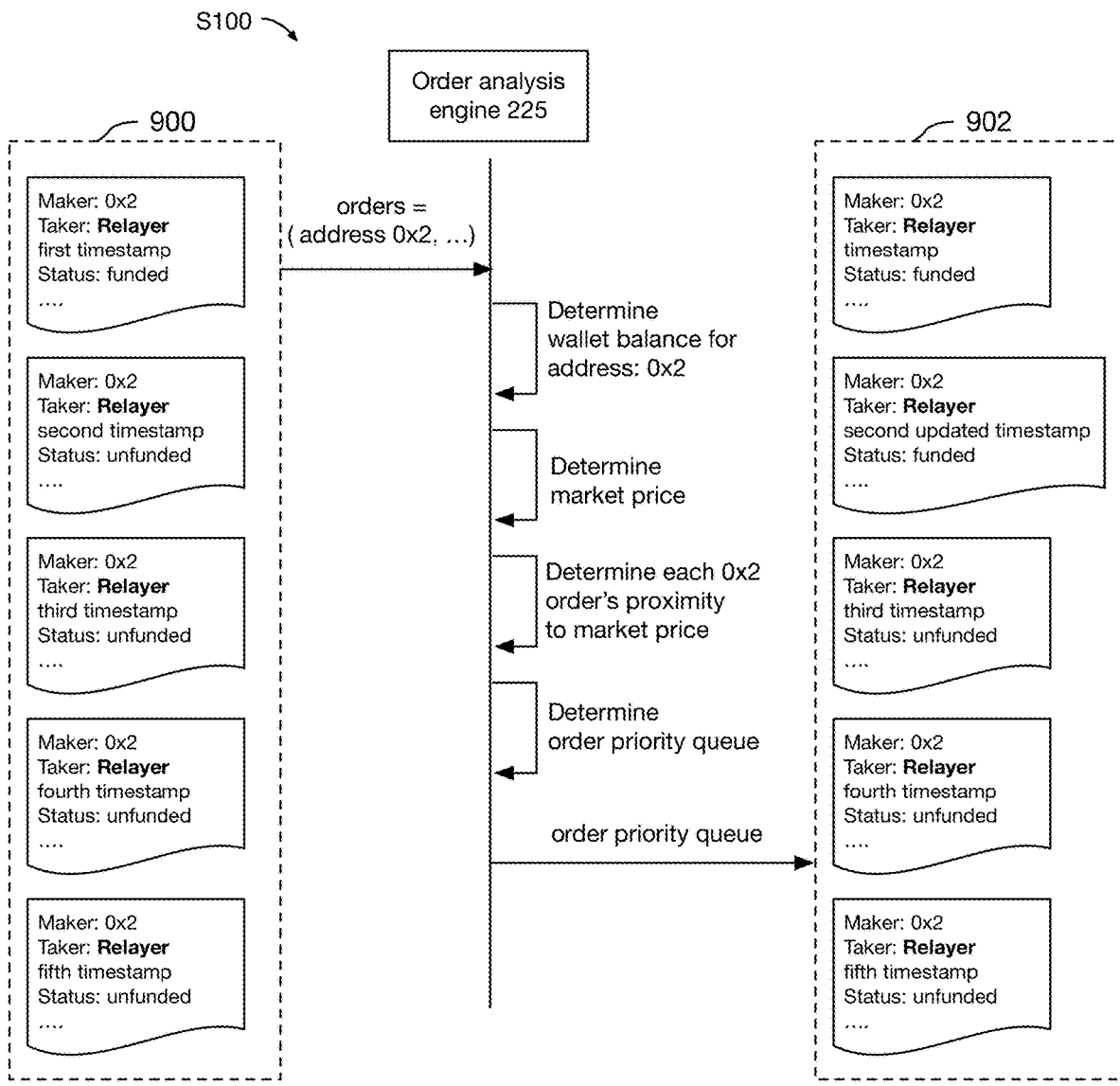
FIG. 9 depicts an example of the order analysis engine.

The selection conditions can include: balance requirements, entity priority rules, and/or any other suitable set of conditions. In variants, balance requirements can be used to determine one or more order sets that can be funded, and entity priority rules can be used to select which order set to fund, or determine the order priority within a selected order set. Balance requirement can include: the collective maker token amounts for the selected orders must add up to less than the balance of the maker token balance for the public address (wallet balance); the maker token amounts for the selected orders must each be less than the balance of the maker token balance; a predetermined set of rules (e.g., specified by the user, specified by the relayer); based on order priority; and/or be any suitable requirement. Entity priority rules can include: market price proximity (e.g., "closest to market"; orders are prioritized based on proximity to market, example shown in FIG. 9), price-time priority (e.g., orders are prioritized based on proximity to market and order timestamp), and/or any other suitable set of rules. The market price is determined based on past matches determined by the matching engine (e.g., using a predictive algorithm), determined from a third party, or otherwise determined.

However, an order's fundedness can be otherwise determined.

Determining a state for an order can optionally include determining an open state based on the order type, wherein the order is marked as open when the current market conditions (e.g., price) satisfy the order conditions. Examples of order conditions include: the current market price falling at or below a specific taker token amount (e.g., for a limit order); stop amount satisfaction (e.g., for a stop order); exceeding the stop amount (e.g., for buy stop orders), or any other suitable condition. In another example, when the order is a market order, the order conditions can include set to open if order is associated with a funded state.

Maintaining the orderbook can additionally or alternatively include prioritizing the orderbook. Prioritizing the orderbook can function to determine an order priority, wherein orders are filled in order of priority. Alternatively, the orderbook can include a pool of orders (e.g., unprioritized orders), wherein the matching engine searches through the orderbook based on a set of matching rules to select matched orders. The orderbook prioritization rules (and/or matching rules) can include price-time priority (e.g., wherein orders are automatically sorted according to price, then the respective orders' time-of-entry or time-of-receipt at the relayer), but can additionally or alternatively include market proximity, or another prioritization rule.

The orderbook preferably prioritizes orders received from a plurality of public addresses (and/or entities), but can additionally or alternatively prioritize orders for a single public address, prioritize only funded orders (e.g., across multiple public addresses), or prioritize any other suitable set of orders. The prioritized orders can be: limited to open/funded orders, all orders, or any other suitable set of orders. When multiple prioritizations are performed, each prioritization can use the same or different prioritization rule. Additionally or alternatively, a first set of rules (e.g., entity priority rules) can be used to determine the orders to mark as open/funded, and a second set of rules can be used to determine the open order priority.

However, S100 can be otherwise performed.

Determining a match between two or more orders S200 functions to create a matched set of orders from orders on the orderbook. S200 is preferably performed by the matching engine, but can additionally or alternatively be performed by any other suitable system. S200 preferably matches orders associated with an open/funded state, but the matched orders can be associated with an unknown, or unfunded state, or any other suitable state. The order is preferably received from the orderbook, but can additionally or alternatively be received from an entity, or determined in any other suitable manner. The orders are preferably matched based on price-time priority, market price proximity (closest to market), second-in-time order is less than first-in-time order, and/or any other suitable set of matching rules. The match can be one to one (e.g., a first order is matched to a second order), many to one (e.g., a first order is matched to a plurality of orders), or the match can be otherwise determined. S200 can be performed periodically; in response to new order receipt; in response to log receipt from the node management module; continuously; and/or at any other suitable time. The match is preferably between a first public address and second public address, different from the first public address, but can additionally or alternatively be between the same public address and/or any other suitable set of addresses.

Figure 3:
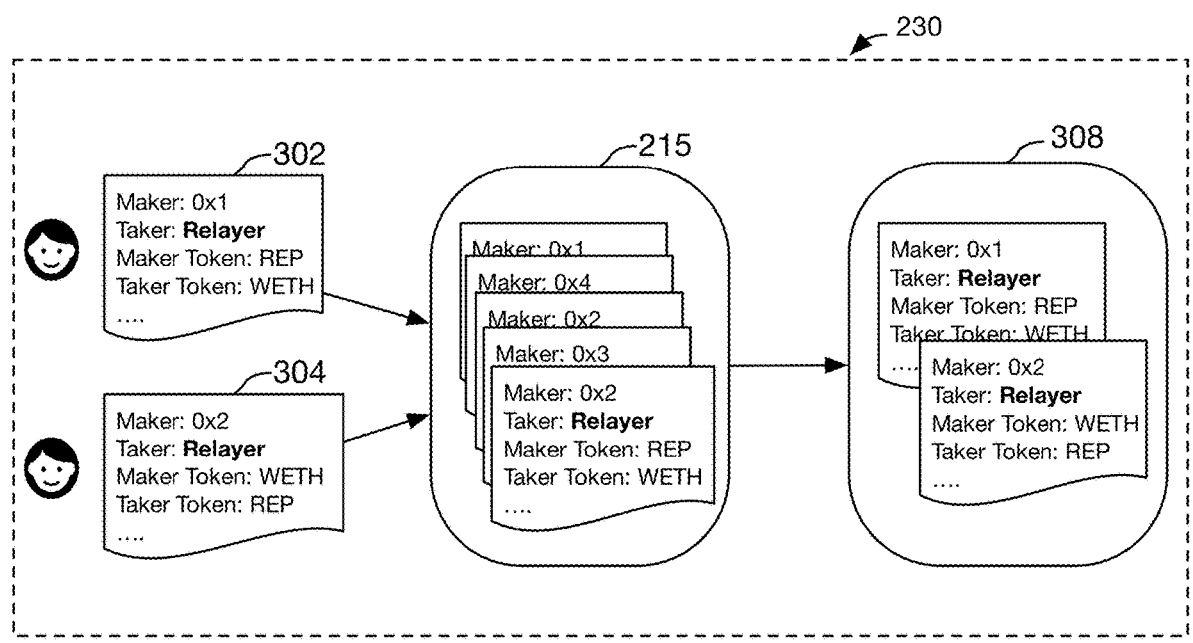
FIG. 3 is an example of the matching engine.

As the example in FIG. 3 illustrates, an relayer operating as a decentralized exchange receives a first order 302 from a first user stipulating the relayer to be the taker and an order request to transfer REP for ETH (i.e. sell a certain amount of REP to buy ETH at the going exchange rate for ETH). The relayer determines whether any extant orders in the orderbook 215 are compatible (e.g., contain requests to transfer ETH for REP in a similar or equal exchange amount), taking exchange rates into consideration. If no extant orders exist, then the relayer places the first order on the orderbook and continues processing. When a second compatible order 304 from a second user comes in, wherein the relayer is the taker, with a request to transfer ETH for REP (i.e. sell a certain amount of ETH to purchase REP at the going exchange rate for ETH) in a similar or equal exchange amount, the relayer matches the two orders together (e.g., to form a matched set of orders 308).

In one variant, the orderbook is organized before the matching engine determines matches. After the orderbook is organized, the highest priority order can be matched by comparing all orders in the book with the highest priority order. In a second variant, the orderbook is unordered, and the matching engine determines matches from the unordered order pool.

However, S200 can additionally or alternatively include any other suitable elements.

The method can additionally or alternatively include determining financial deductions for the matched orders S300. S300 preferably functions to determine price adjustments associated with a transaction. S300 is preferably performed by the price adjustment engine, but can be performed by any other suitable component. Financial deductions are preferably determined before the transaction (e.g., atomic transaction) is broadcasted to the blockchain, but can additionally or alternatively be determined after, or at any other suitable time. Financial deductions are preferably extracted at the transaction filling (e.g., wherein the financial deductions are included as part of the return orders generated by the relayer), but can additionally or alternatively be extracted after the transaction is settled on the blockchain and the transaction is filled (e.g., as a separate return transaction returning assets to a selected entity), before, and/or at any other suitable time.

Figure 5:
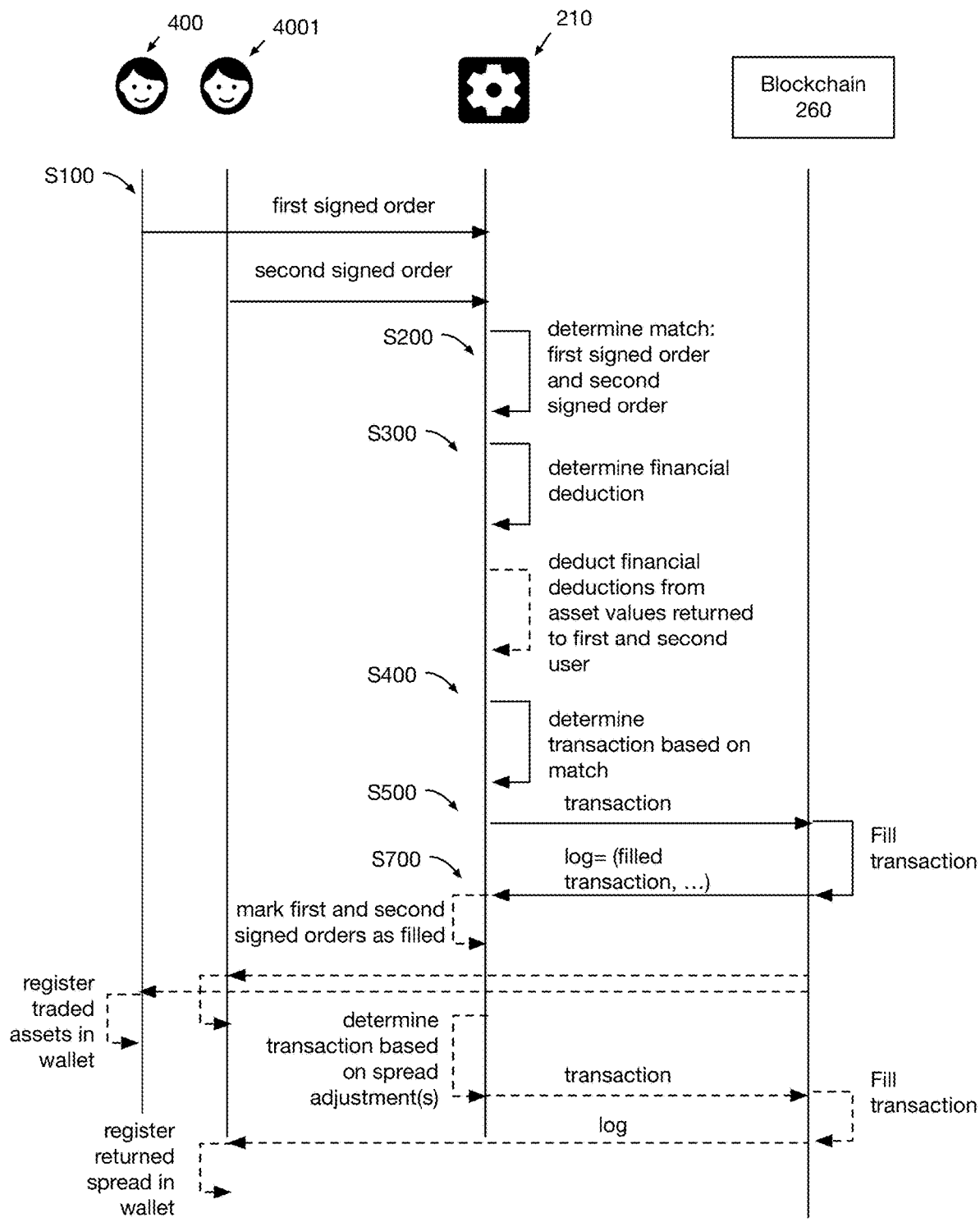
FIG. 5 depicts variants of information shared between a user associated with an address and components of the system.

An example of S300 is shown in FIG. 5.

In one example, if the transaction is killed, the relayer can charge the public addresses associated with the killed transaction a fee for the transaction (e.g., wherein the next broadcast transaction with the respective public addresses' orders can include fees for the current broadcast and fees for the prior, unsuccessful broadcast).

In a second example, spread is determined returned to the spread receiver, wherein the spread receiver can be the second order in time (e.g., determined based on order timestamps), but can additionally or alternatively be first in time, or be received by exchange as fees.

Financial deductions can include fees (e.g., gas fee associated with the gas price, transaction fee, etc.), additional values (e.g., price spread), and/or correction factors, but can additionally or alternatively include any other suitable price adjustment.

Fees can include: gas fees, relayer fees, and/or any other suitable fee. The fees can be in a single asset (token type), in the user orders' maker tokens, and/or be in any other suitable cryptocurrency. When the fees are in a predetermined token and the maker token(s) are different from the predetermined token, the atomic transaction can optionally include a fee conversion order or sub-transaction that converts the maker token to the fee token (e.g., at the market rate, as determined by the relayer from the orderbook and/or a third party source).

Fees are preferably split evenly between the orders and/or public addresses within a match, but can additionally or alternatively be split evenly between the two sides of the trade, be split proportionally based on the token amounts, split based on each timestamp associated with the respective order (e.g., 10 percent of the asset value of the order with the earlier timestamp and 30 percent of the asset value of the order with the later timestamp), be paid by the relayer, or be otherwise split. The fees can be a predetermined amount, be dynamically determined (e.g., retrieved from a database, estimated, calculated from the token amounts, calculated from the number of orders in the transaction, be a predetermined percentage of any received order, etc.), vary based on token price (e.g., relative to a standard token, such as WETH, USDC, etc.), or be otherwise determined. Fees are preferably deducted from the return orders generated by the relayer (e.g., paired with the matched transactions within the atomic transaction), more preferably from the taker token amount of the users' orders, but can additionally or alternatively be paid through another channel (e.g., wherein the users pay a fiat fee to the relayer), be paid through a separate transaction (e.g., before or after the orders are filled), or otherwise paid.

The gas fee (gas price) is preferably estimated such that a transaction broadcasted on the blockchain at the gas price will be mined by miners associated with the blockchain. The gas price is preferably deducted from each order equally (e.g., half from the first order and half from the second order), but can be deducted from one order or the other, or otherwise determined, assigned, and/or deducted. The gas price can be estimated (e.g., from historical trends), retrieved (e.g., from a third party database), or otherwise determined.

The price spread is preferably the difference between the buy rate and the sell rate for a given token in a matched set of orders. In some embodiments, the price spread is determined by calculating the price spread for the single transaction. Spread is preferably sent to the spread receiver, but can additionally or alternatively be sent to any other suitable recipient. Spread is preferably sent in a separate transaction, after the matched order transaction (atomic transaction) is filled, but can additionally or alternatively be sent in the matched order transaction (atomic transaction), wherein the spread recipient's taker token amount is credited the spread amount. However, the spread can be otherwise sent to the spread receiver.

Figure 6:
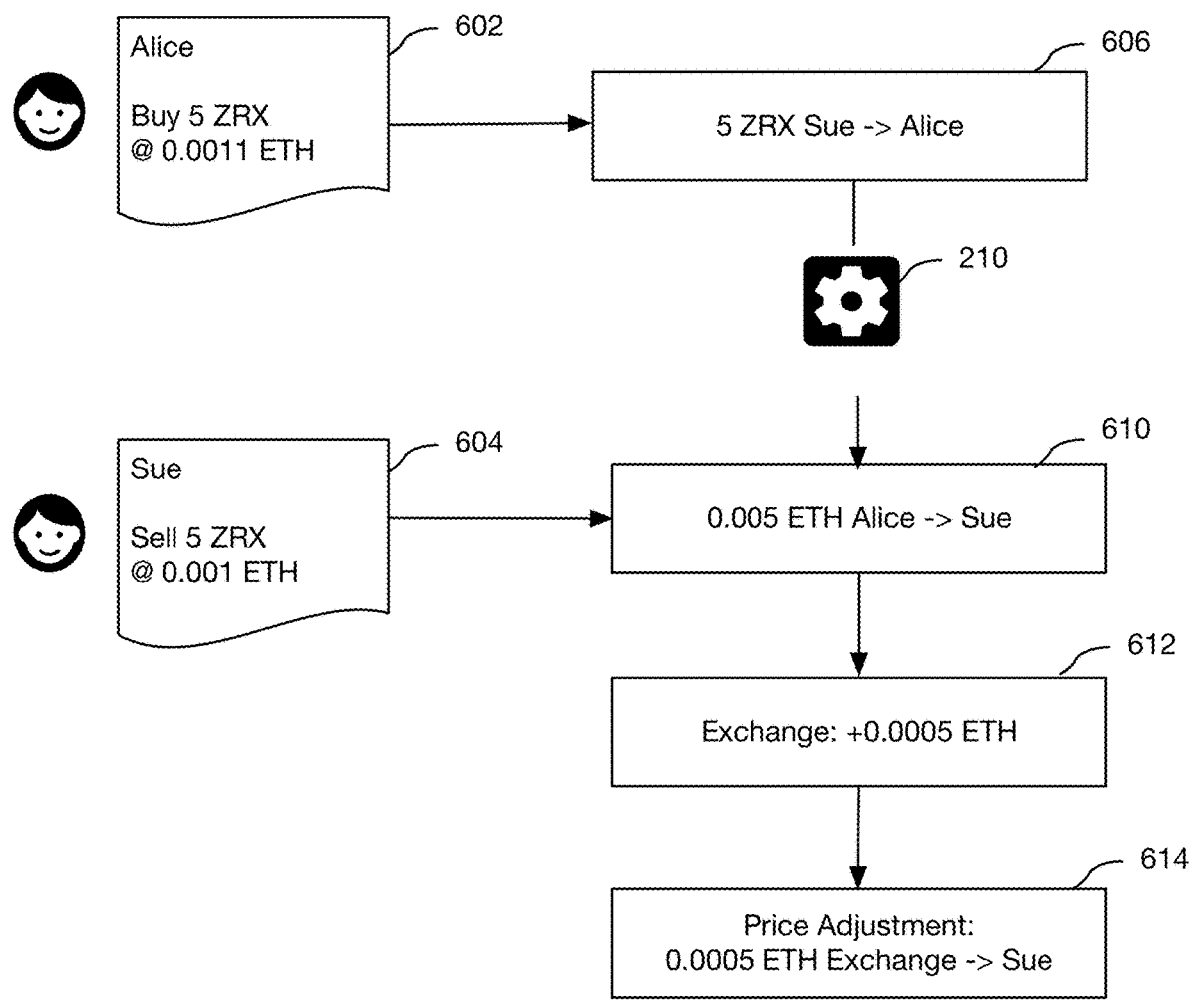
FIG. 6 depicts an example of the price adjustment engine.

For example, as shown in FIG. 6, the relayer 210 receives a first order 602 from a first user Alice. The relayer verifies that the first order specifies the relayer as taker. The first order is for buying 5 ZRX at the exchange rate of 0.0011 ETH. The relayer determines that no compatible order exists on the orderbook to match the first order with, and continues to process orders. At a later point in time, the relayer receives a second order 604 from a second user Sue. The relayer verifies that the second order specifies the relayer as taker. The second order is for selling 5 ZRX at the exchange rate of 0.001 ETH. Since Alice wishes to buy 5 ZRX and Sue wishes to sell 5 ZRX, the relayer determines that the two orders are compatible for fulfillment, and the relayer matches the two orders together. The relayer proceeds to fulfill both orders in a single, atomic transaction. The result is that in a first trade 606, 5 ZRX is transferred from Sue to Alice, with the relayer acting as the intermediary taker facilitating the transfer, and in a second trade 610, 0.005 ETH is transferred from Alice to Sue. As a result of the price spread between the exchange rates of 0.0011 ETH and 0.001 ETH, the relayer determines a price adjustment output 612. The relayer determines that it has accrued an extra 0.0005 ETH from the transaction (612). The relayer passes this surplus or arbitrage on to Sue, the second order on the books, so that Sue obtains the benefit of the price spread gain. Thus, the system facilitates a price adjustment 614 of 0.0005 ETH transferred from the exchange to Sue (e.g., in a separate transaction that incurs separate gas fees).

However, S300 can additionally or alternatively include any other suitable element.

The method can include generating a transaction based on the matched set of orders S400. S400 preferably functions to determine trades between the orders and the relayer (e.g., 4 orders, wherein 2 orders from a trade as shown in FIG. 10). S400 preferably processes a matched set of orders. S400 is preferably performed by the transaction engine. The transaction is preferably an atomic transaction including the signed orders and a set of return orders complimentary to the signed orders, but can additionally or alternatively be otherwise configured. The return orders preferably return the user orders' taker tokens to the users (respective public addresses), wherein the return orders can specify: the relayer as the maker, the user as the taker, and the user's taker token as the return order's maker token; however, the return orders can be otherwise configured. The relayer can sign the return orders, sign the transaction, and/or otherwise verify the transaction. The transaction can optionally be associated with an expiration time, wherein the expiration time can be:

the constituent orders' nearest expiration time, furthest expiration time, a predetermined expiration time, the estimated time when the gas fee will rise above a predetermined threshold, and/or any other suitable time. For example, the transaction engine can receive the two matching orders matched together by matching engine and attempts to fulfill both of them in a single transaction (e.g., single atomic transaction, depending on token limits determined by the relayer). The transaction engine can attempt to fulfill both of orders in a single transaction (atomic transaction) by determining a set of return orders for the set of matched orders (e.g., when there are two matched orders, there will be two return orders). In variants, these return orders are required because the user orders specify the relayer as the taker; without the return orders, the relayers would accrue the user assets and function as a custodial exchange.

Figure 10A:
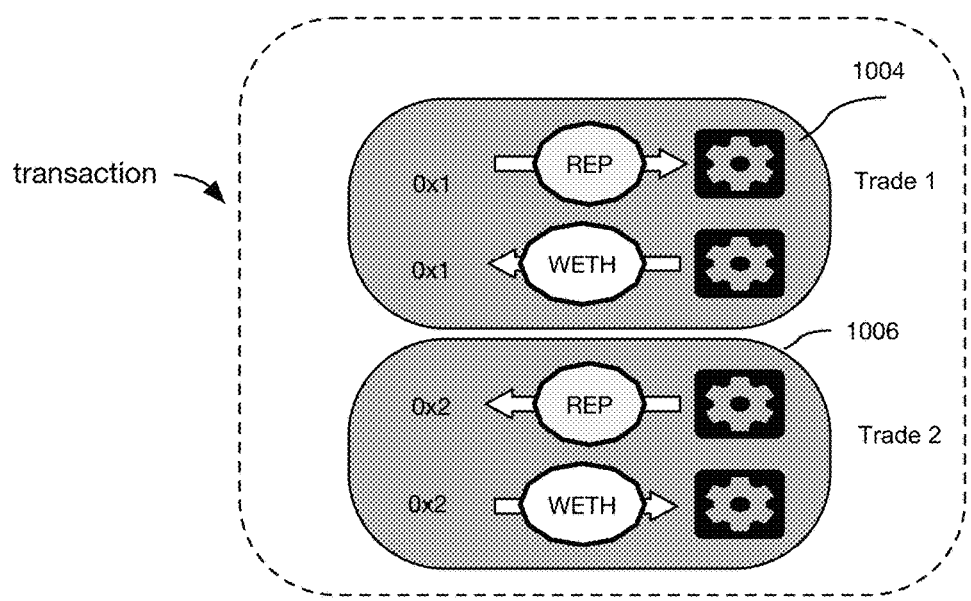
FIGS. 10A and 10B depict a first and second variant of a transaction.

In one variant of a transaction, as shown in FIG. 10A, in a first trade 1004, the first user associated with the first order sends REP to the relayer, and in return the relayer sends WETH (wrapped ETH) to the first user. In a second trade 1006, the exchange sends REP to the second user, and in return the second user sends WETH to the exchange.

Figure 10B:
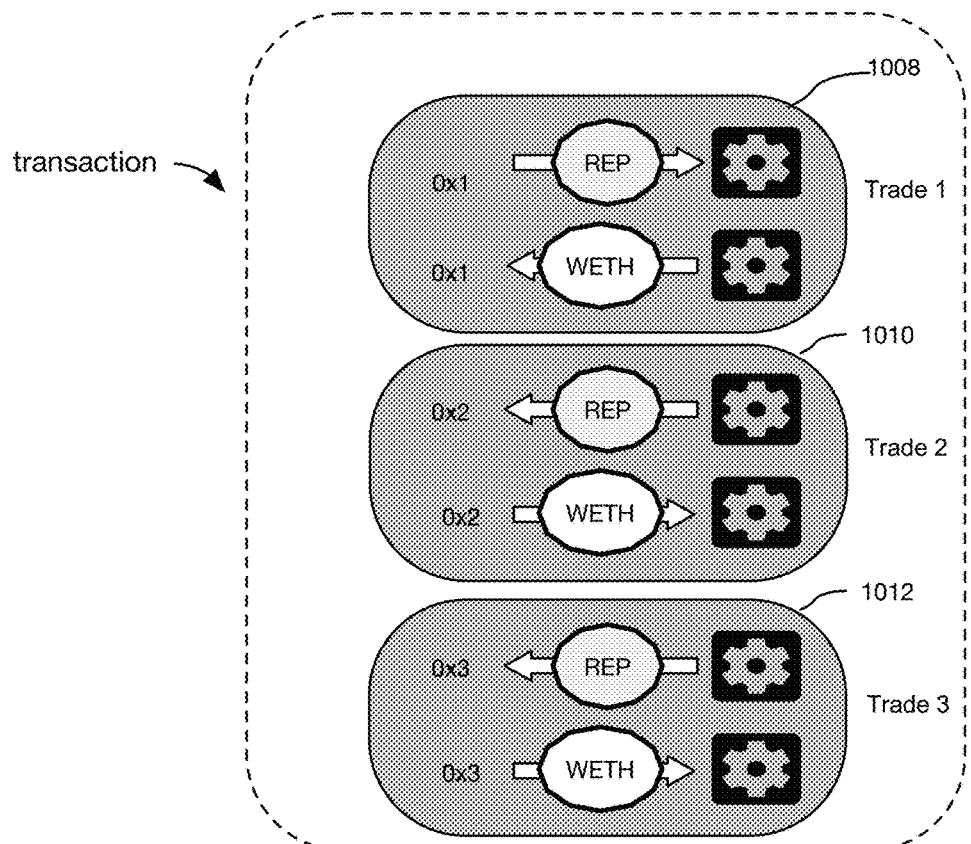

In a second variant of a transaction, as shown in FIG. 10B, a matched set of orders can include multiple (e.g., three) trades (e.g., the matched set of orders includes three orders wherein two orders are used to fill a first order). In a first trade 1008, the first user associated with the first order sends REP to the relayer, and in return the relayer sends WETH to the first user. In a second trade 1010, the exchange sends REP to the second user, and in return the second user sends WETH to the exchange. In a third trade 1012, the exchange sends REP to the third user, and in return the third user sends WETH to the exchange.

The transaction includes the set of matched orders, preferably less fees, but can additionally or alternatively include the fees (e.g., wherein the fees are paid through another channel and/or after the transaction is validated on-chain).

For example, the transaction engine can receive order 1 from user 1 and order 2 from user 2, wherein order 1 and order 2 are matched; the transaction engine can determine order 3 associated with the relayer, wherein order 3 is from the relayer to user 1; and the transaction engine can determine order 4 associated with the relayer, wherein order 4 is from the relayer to user 2. Order 1 can be selling token 1 and buying token 2; order 2 can be selling token 2 and buying token 1. Order 3 can transfer token 2 to user 1 (e.g., to the public address associated with user 1), and order 4 can transfer token 1 to user 2 (e.g., to the public address associated with user 2). The amount of token 2 transferred to user 1 is preferably the amount of token 2 that is sold by user 2 (e.g., in order 2), less financial deductions (e.g., gas and fees), but can be any other suitable amount. The amount of token 1 transferred to user 2 is preferably the amount of token 1 that is sold by user 1, less financial deductions (e.g., gas and fees), but can be any other suitable amount.

The transaction can additionally or alternatively include a transaction expiration timestamp. The transaction expiration timestamp can be predetermined, dynamically determined, determined based on constituent orders' expiration time(s), but can additionally or alternatively be otherwise determined. The transaction expiration timestamp can be different from the constituent orders' expiration timestamp, but can additionally or alternatively be equal to the shortest constituent order expiration time, be equal to the longest constituent order expiration time, or be otherwise determined.

S400 can additionally or alternatively include signing the transaction by the relayer (e.g., with the relayer's private key), but the transaction can additionally or alternatively be signed by any other suitable entity. However, S400 can additionally or alternatively include any other suitable elements.

However, S400 can include any other suitable elements.

The method preferably includes transmitting the transaction to the blockchain S500, which functions to settle transactions on the blockchain (e.g., when the transaction is validated by miners of the blockchain). S400 is preferably performed by the node management module, but can be otherwise performed.

S500 can optionally include upon satisfaction of a rebroadcast condition, determining a second gas price, wherein the second gas price is higher than the original gas price, and re-broadcasting the transaction at the second gas price. The rebroadcast condition can include: expiration of a predetermined time duration (e.g., a parameter set by the relayer, 5 min, 10 min), receipt of a transaction failure event or log from the blockchain, and/or any other suitable set of conditions.

Figure 7:
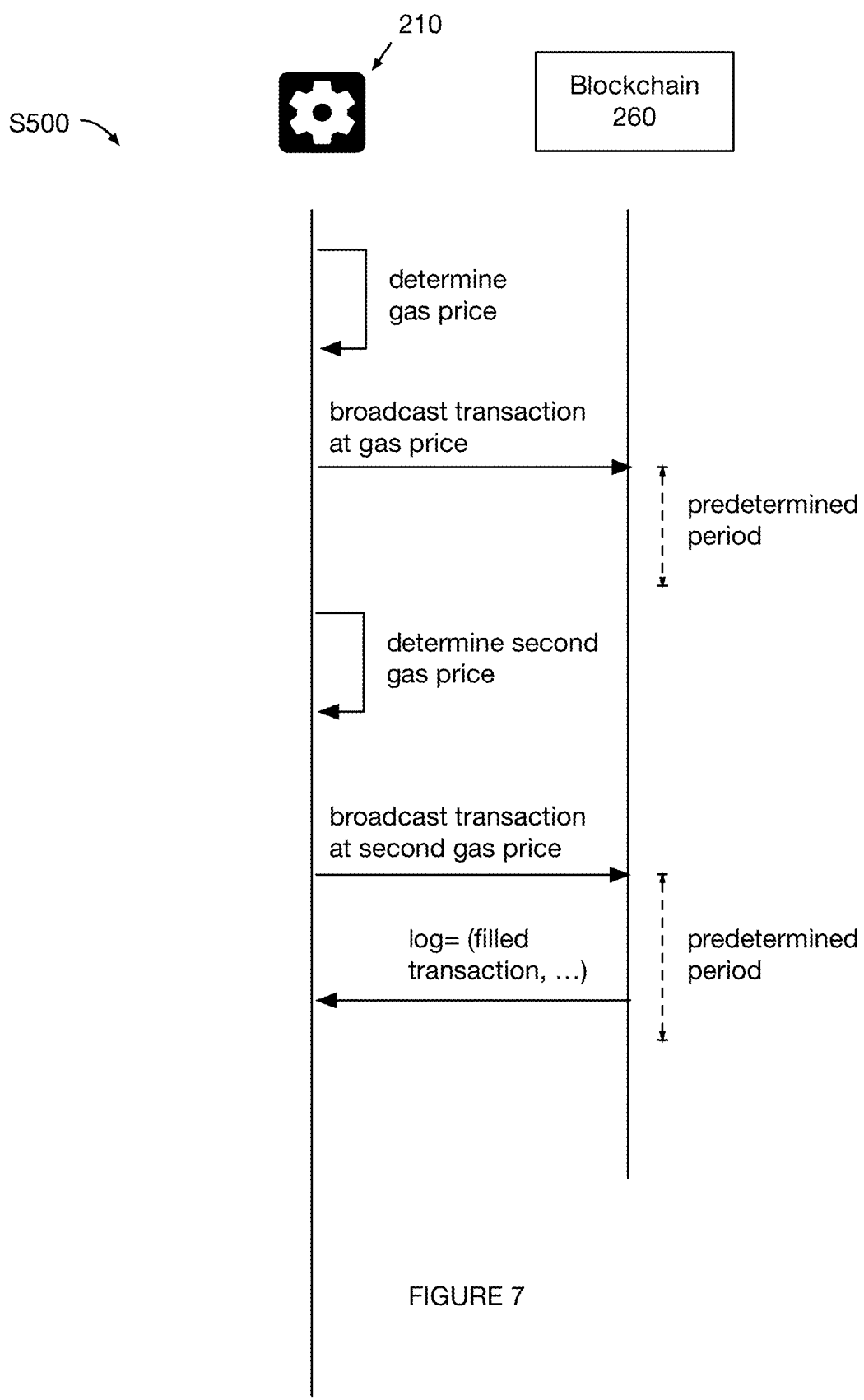
FIG. 7 depicts variants of information shared between a user associated with an address and components of the system.

An example of S500 is depicted in FIG. 7.

However, S500 can additionally or alternatively include any other suitable elements.

The method preferably includes managing the orders in the matched set based on settlement information from the blockchain S600. S600 is preferably performed by the order analysis engine, but can alternatively be performed by the node management module or any other suitable module. S600 is preferably determines the outcome of a transaction (e.g., filled, killed) based on monitoring logs associated with the transaction, wherein the logs were broadcasted by the blockchain. S600 can additionally determine if the transaction was killed by determining timestamp expiry (e.g., that the order timestamp expired and/or the transaction timestamp expired). However, the outcome of the transaction can be otherwise determined.

When S600 determines that an order is filled, the price adjustment engine can extract financial deductions from the order (e.g., from the profit). In a first variation, the deduction is accounted for in the transaction (e.g., in the return order amounts), such that the deduction is automatically performed upon transaction verification. In a second variation, the deductions are charged after the transaction is filled. However, the deductions can be charged at any suitable time. In response to determination that the transaction was verified or filled, orders within the transaction can be marked as "filled" and/or be removed from the orderbook; however, the orders within the transaction can be otherwise managed.

When S600 determines that the order is killed or unsuccessful, the method can include determining the cause of transaction failure and resubmitting valid orders from the failed transaction. Example causes of transaction failure can include: inclusion of a failed order (e.g., an unfunded order, an expired order, etc.) within the transaction, transaction expiration, and/or any other suitable cause. The cause of the transaction failure can be determined from: the orders, the transaction itself, the blockchain event associated with the transaction, and/or any other suitable source.

In a first variation, determining the cause of transaction failure includes determining the order(s) that killed the transaction (e.g., caused the transaction to fail). Determining the orders that killed the transaction can include: reevaluating the orders within the transaction (e.g., by repeating S100 for each order), comparing the order expiration time with a current time, interpreting a failure code generated by the smart contract attempting to fill the transaction, or otherwise determining which order(s) caused the transaction to fail.

In a second variation, determining the cause of transaction failure includes determining whether the transaction's expiration time has passed (e.g, by comparing a transaction expiration time with a current time). However, the transaction failure cause can be otherwise determined.

In a first variation, resubmitting valid orders from the failed transaction includes: marking the order state of the failed order(s) as "unfunded," "closed," "unknown," "cancelled," or "expired;" marking the order states remaining of the remaining orders as "open/filled;" and returning the orders, with the new order states, to the orderbook for subsequent matching.

In a second variation, resubmitting valid orders from the failed transaction includes: updating the transaction expiration time and/or determining a new gas price for the transaction, and rebroadcating the transaction to the blockchain.

In some embodiments, a batchFillorKill( ) function attempts to fulfill both of the orders and, in the event of any errors, exceptions, or failures to follow the exchange protocol for order creation by one or both orders, kills or rejects both of the orders at once. In some embodiments, either both orders are fulfilled, or both orders are rejected.

However, S600 can additionally or alternatively include any other suitable elements.

The method can additionally or alternatively include monitoring the blockchain S700. S700 preferably functions to determine transaction states and identify transactions or logs associated with public addresses, but can additionally or alternatively perform any other suitable set of functionalities. S600 is preferably performed by the node management module, but can additionally or alternatively be performed by any other suitable component.

In one variation, S700 can include listening (receiving) to logs broadcasted by the blockchain. Listening to logs can include preferably running partial nodes, but can additionally or alternatively include running full nodes, and/or be otherwise determined. Each log can be associated with a token contract between a set of public addresses (e.g., 2 public addresses, 3 public addresses, etc.), be associated with a transaction event (e.g., wherein assets are sent and/or received) for one or more public addresses, or be associated with any other suitable blockchain event or data structure. The logs (collectively) can be used to determine a ledger for the public addresses' wallet balance. The logs can be downloaded, scraped, or otherwise accessed.

In a second variation, S700 can include querying the blockchain to determine known information about a public address (e.g., public addresses with unclosed or unfilled orders on the orderbook), but can additionally or alternatively include querying for transactions to a user, querying for transactions from a user, query for transactions to the relayer's public address, querying for the state of a transaction (e.g., the transaction), or querying for any other suitable search parameter. S700 can include querying a full node, a partial node, or otherwise querying the blockchain.

However, S700 can additionally or alternatively include any other suitable element.

The method can additionally or alternatively include determining that an address is associated with an entity S800. S800 functions to determine whether an entity owns an address, and/or whether the address is associated with a second entity, wherein the second entity owns the address (e.g., proxy). S800 is preferably performed by the ownership engine, but can additionally or alternatively be performed by the order analysis engine, or any other suitable component. S800 is preferably performed before accepting orders from the first entity. S800 is preferably performed in response to a first entity access request, after receiving an order from the first entity, the first entity challenge request, and/or at any other suitable time.

Figure 8:
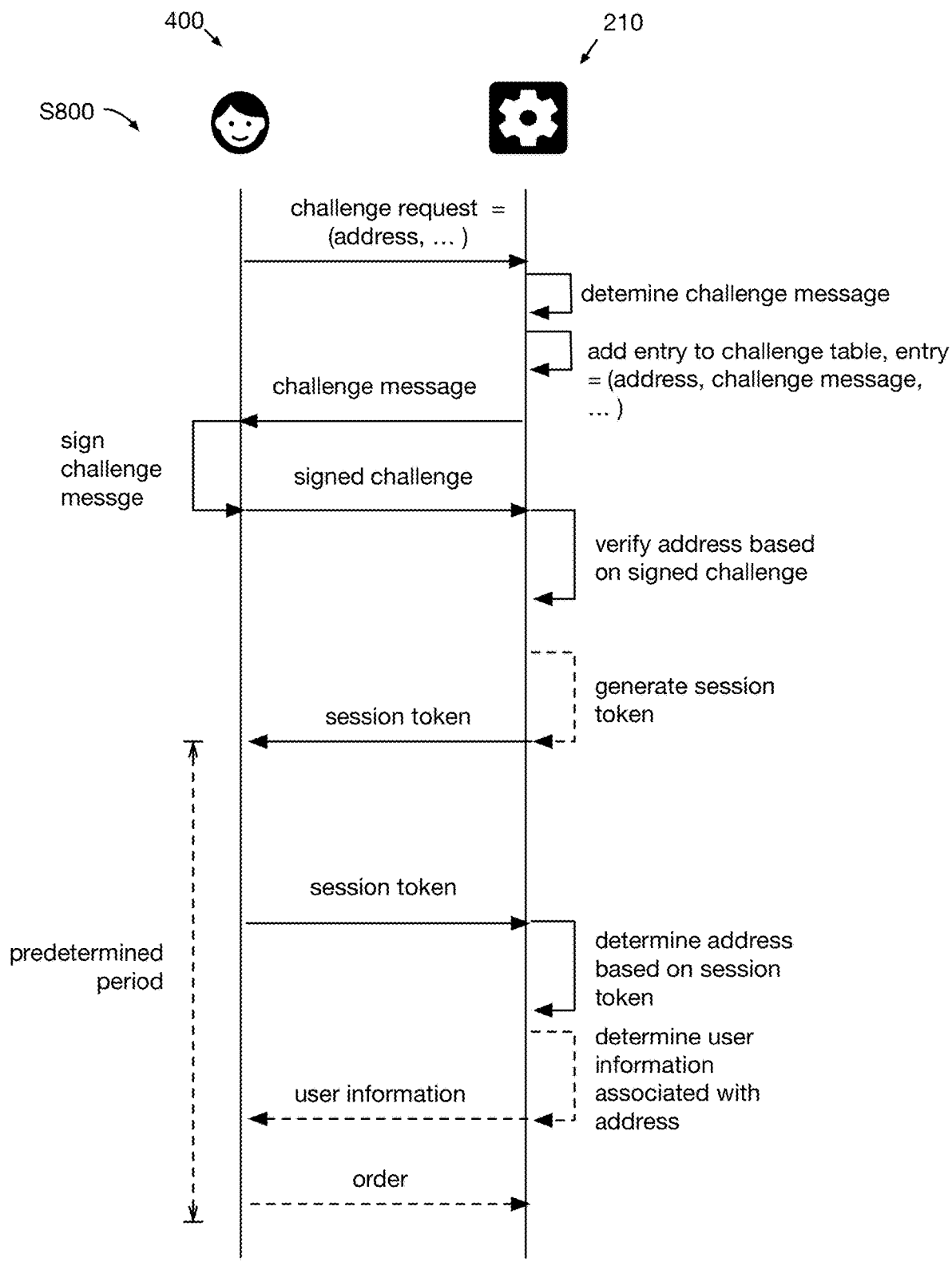
FIG. 8 depicts variants of information shared between a user associated with an address and components of the system.

As an example, as shown in FIG. 8, S800 can include the relayer sending a challenge to an entity 400.

S800 is preferably performed in response to receipt of a challenge request from an entity (e.g., from a user device, from an address), but can be performed at any other suitable time. The challenge request can include: an entity endpoint (e.g., user device identifier, email address, native client identifier, browser client identifier, etc.), a public address to be verified (unverified public address), and/or any other suitable information. The challenge request can be received off-chain (e.g., through the API, through a browser request, through an email, etc.), but can alternatively be received on-chain.

The challenge is preferably generated in response to receipt of the challenge request, but can alternatively be generated after. The challenge can be generated: randomly, based on the unverified public address, based on the entity endpoint, and/or based on any other suitable information. The challenge preferably includes random text, but can additionally or alternatively include structured text, and/or any other suitable string or challenge. The challenge is preferably set to the entity in response to the challenge request for signature with the entity's private key (e.g., asymmetrically paired with the public key used to generate unverified public address). A challenge table preferably stores the unverified public address (determined from the challenge request) and the associated challenge.

S800 can optionally include verifying the signed challenge received from the entity. In one example, the first entity, in response to receiving the challenge string, signs the challenge string with their private key. After signing, the first entity sends the signed challenge string back to the relayer.

The signature is preferably cryptographically verified (e.g., wherein the challenge is signed by the private key for the unverified public address associated with the challenge), but can be otherwise verified. In variants, the system verifies that the challenge, associated with a public address, was signed by the private key associated with the respective public address (e.g., with the public key associated with the public address. For example, the relayer runs a recover algorithm to determine if the unverified address, determined from the signed challenge using recover algorithm, is the same as the public address associated with the first entity (e.g., associated with the challenge). If the addresses are the same, approves the address.

Upon signature verification, the relayer can issue the entity endpoint (e.g., user device, client, etc.), associated with the verified public address, a session token. The session token can be stored in the challenge table in association with the public address and/or user device identifier, but can be otherwise stored. The session token can be used at a later, predetermined time to associate a user with the public address owned by the user (e.g., to retrieve user information, stored by the relayer in association with the public address, etc.). The relayer can additionally or alternatively store user preferences in association with the verified public address, determine a wallet balance for the verified public address, and/or perform any other suitable process for the verified wallet balance. However, S800 can be otherwise performed.

Embodiments of the above system and/or method can be implemented in a computer-readable medium storing computer-readable instructions. The computer-readable medium may be stored on any suitable computer readable media such as volatile memory and/or non-volatile memory (e.g., RAMs, ROMs, flash memory, EEPROMs, etc.), or any suitable storage medium. The instructions are preferably executed by one or more computer-executable components and/or the system, but can be otherwise executed. The computer-executable component can include one or more processors (e.g., microprocessors, CPUs, GPUs, ASICs, etc.), but the instructions may alternatively or additionally be executed by any suitable dedicated hardware device. The computing system (e.g., including the computer-readable medium, computer-executable component, and/or any other suitable component) can be: local, remote, distributed, or otherwise arranged.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising, at a relayer and off of a blockchain:
   receiving a first order associated with a public address, wherein the first order specifies the relayer as an order recipient;
   determining a wallet balance associated with the public address by monitoring the blockchain;
   determining whether the first order is funded, based on the wallet balance;
   when the first order is funded, determining an order match, wherein a transaction, comprising the order match, is broadcast to the blockchain; and
   determining an order priority queue for a plurality of orders associated with the public address, wherein determining the order priority queue comprises:
       determining a market price;
       prioritizing orders associated with the public address based on proximity to the market price; and
       marking the orders, in order of decreasing proximity, that collectively summing to less than the wallet balance, as funded.

2. The method of claim 1, wherein the first order is signed by a private key associated with the public address.

3. The method of claim 2, wherein the first order is matched to a plurality of orders, and wherein the transaction comprises the first order and the plurality of orders, the method further comprising, at the relayer: generating the transaction and signing the transaction.

4. The method of claim 3, further comprising:
   determining a plurality of price spreads between the first order and the plurality of orders, wherein each of the plurality of orders is associated with a timestamp; and
   when the transaction is filled by the blockchain, for each of the plurality of price spreads, sending the price spread to the public address.

5. The method of claim 1, wherein the first order is signed by a proxy associated with a second public address, wherein:
   the second public address is different from the public address; and
   the second public address and the public address are associated with the same wallet.

6. The method of claim 1, wherein determining the wallet balance comprises:
   determining that a log address, associated with a log emitted by the blockchain, is the same as the public address;
   determining a transaction history of the public address based on the log; and
   determining an order priority queue for a set of orders associated with the public address based on the transaction history.

7. The method of claim 1, further comprising, when the first order is not funded:
   determining a second wallet balance associated with the public address based on blockchain events associated with the public address, received from the blockchain; and
   when the second wallet balance is above a predetermined threshold, the predetermined threshold determined based on the first order, marking the first order as funded.

8. The method of claim 1, further comprising:
   determining fees for the order match; and
   before the transaction is broadcast to the blockchain, reducing an asset amount returned to each order within the order match by a predetermined fraction of the fees.

9. The method of claim 1, further comprising:
   broadcasting the transaction to the blockchain;
   after broadcasting the transaction, determining that the transaction is unfilled; and
   in response to determining the transaction is unfilled:
       determining a gas price; and
       rebroadcasting the transaction to the blockchain at the gas price.

10. The method of claim 1, further comprising verifying user association with the public address, comprising:
    receiving a challenge request, comprising the public address, from a user;
    after receiving the challenge request, sending a challenge message to the user;
    receiving a signed challenge message, wherein the signed challenge message comprises the challenge message, signed by the user;
    determining an unverified address from the signed challenge message; and
    when the unverified address is the same as the public address, determining that the user controls the public address.

11. The method of claim 10, further comprising, in response to verifying user association with the public address:
    issuing the user a session token;
    within a predetermined period, receiving the session token from the user; and
    in response to receiving the session token, storing information associated with the user.

12. A method, comprising, at a relayer and off of a blockchain:
    receiving a first order associated with a public address, wherein the first order specifies the relayer as an order recipient;
    determining a wallet balance associated with the public address by monitoring the blockchain;

determining whether the first order is funded, based on the wallet balance;

when the first order is funded, determining an order match, wherein a transaction, comprising the order match, is broadcast to the blockchain; and when the first order is not funded:
  determining a second wallet balance associated with the public address based on blockchain events associated with the public address, received from the blockchain; and
  when the second wallet balance is above a predetermined threshold, the predetermined threshold determined based on the first order, marking the first order as funded.

13. The method of claim 12, further comprising:
determining a plurality of price spreads between the first order and a plurality of orders of the transaction, wherein each of the plurality of orders is associated with a timestamp; and
when the transaction is filled by the blockchain, for each of the plurality of price spreads, sending the price spread to the public address.

14. The method of claim 12, wherein the first order is signed by a proxy associated with a second public address, wherein:
  the second public address is different from the public address; and
  the second public address and the public address are associated with the same wallet.

15. The method of claim 12, wherein determining the wallet balance comprises:
  determining that a log address, associated with a log emitted by the blockchain, is the same as the public address;
  determining a transaction history of the public address based on the log; and
  determining an order priority queue for a set of orders associated with the public address based on the transaction history.

16. The method of claim 12, further comprising verifying user association with the public address, comprising:
  receiving a challenge request, comprising the public address, from a user;
  after receiving the challenge request, sending a challenge message to the user;
  receiving a signed challenge message, wherein the signed challenge message comprises the challenge message, signed by the user;
  determining an unverified address from the signed challenge message; and
  when the unverified address is the same as the public address, determining that the user controls the public address.

17. A method, comprising, at a relayer and off of a blockchain:
  receiving a first order associated with a public address, wherein the first order specifies the relayer as an order recipient;
  determining a wallet balance associated with the public address by monitoring the blockchain;
  determining whether the first order is funded, based on the wallet balance;
  when the first order is funded, determining an order match, wherein a transaction, comprising the order match, is broadcast to the blockchain; and
  verifying user association with the public address, comprising:
    receiving a challenge request, comprising the public address, from a user;
    after receiving the challenge request, sending a challenge message to the user;
    receiving a signed challenge message, wherein the signed challenge message comprises the challenge message, signed by the user;
    determining an unverified address from the signed challenge message; and
    when the unverified address is the same as the public address, determining that the user controls the public address.

18. The method of claim 17, further comprising:
determining a plurality of price spreads between the first order and a plurality of orders of the transaction, wherein each of the plurality of orders is associated with a timestamp; and
when the transaction is filled by the blockchain, for each of the plurality of price spreads, sending the price spread to the public address.

19. The method of claim 17, wherein the first order is signed by a proxy associated with a second public address, wherein:
  the second public address is different from the public address; and
  the second public address and the public address are associated with the same wallet.

20. The method of claim 17, wherein determining the wallet balance comprises:
  determining that a log address, associated with a log emitted by the blockchain, is the same as the public address;
  determining a transaction history of the public address based on the log; and
  determining an order priority queue for a set of orders associated with the public address based on the transaction history.

* * * * *